S. G. NEAL.
TRIPLE VALVE FOR AIR BRAKES.
APPLICATION FILED OCT. 21, 1914.
1,125,871.
Patented Jan. 19, 1915.
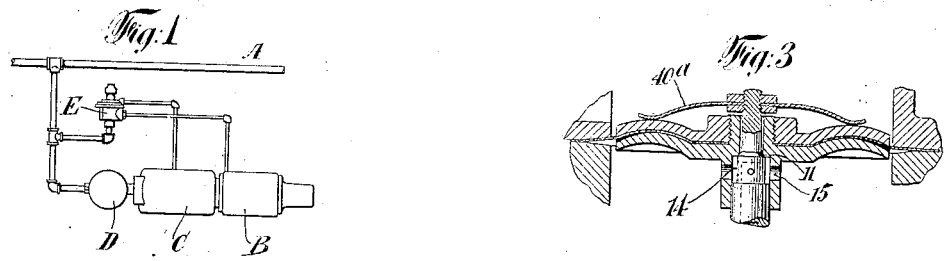
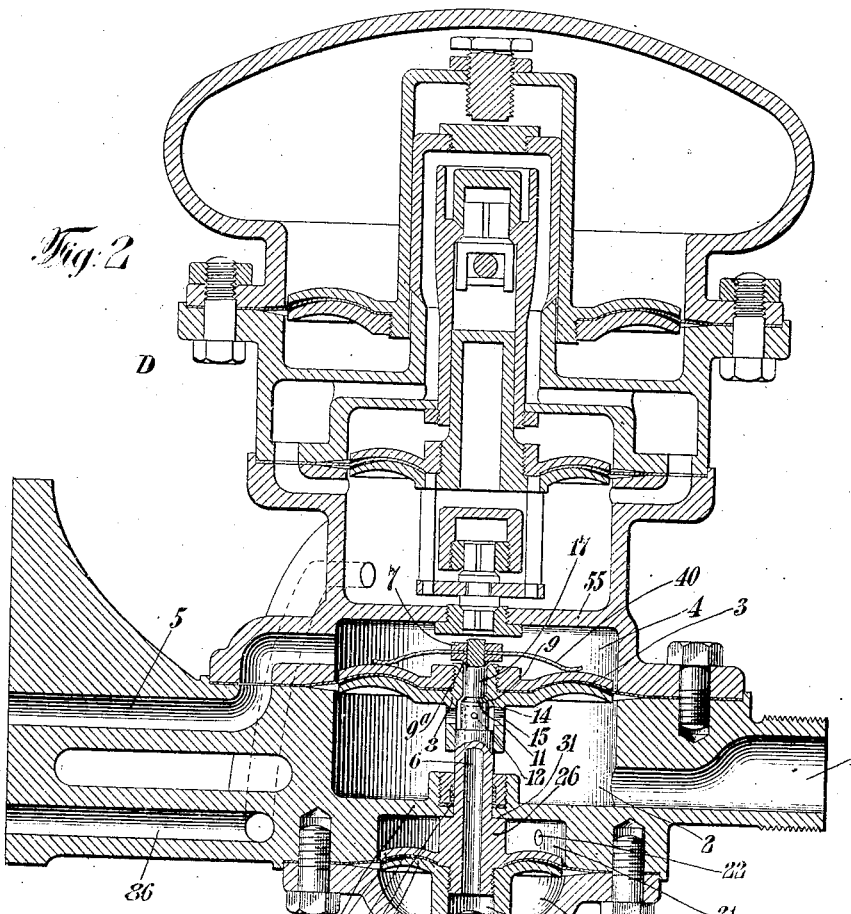

UNITED STATES PATENT OFFICE.

SPENCER G. NEAL, OF LOS ANGELES, CALIFORNIA, ASSIGNOR TO CALIFORNIA VALVE AND AIR BRAKE COMPANY, OF LOS ANGELES, CALIFORNIA, A CORPORATION OF CALIFORNIA.

TRIPLE VALVE FOR AIR-BRAKES.

1,125,871.

Specification of Letters Patent.

Patented Jan. 19, 1915.

Application filed October 21, 1914. Serial No. 867,690.

*To all whom it may concern:*

Be it known that I, SPENCER G. NEAL, a citizen of the United States, resident of the city of Los Angeles, county of Los Angeles, State of California, have invented certain new and useful Improvements in Triple Valves for Air-Brakes, of which the following is a specification.

This invention relates to improvements in the triple valve covered by my Patents Nos. 1,078,303, dated November 11, 1913, and 1,082,758, dated December 30, 1913, the improvement being especially desirable when said triple valve is used in a braking system embodying the auxiliary pressure control valve shown in my Patent No. 1,091,754, dated March 31st, 1914.

One of the important objects of the invention is to provide means whereby the auxiliary reservoir pressure may be maintained at a pressure slightly below normal train line pressure, a spring device being employed to close the valve controlling communication between the train line and the auxiliary reservoir.

In the operation of the triple valves shown in the herein-mentioned patents in connection with the auxiliary pressure control valve of Patent No. 1,091,754, there is no means for supplying auxiliary reservoir leaks after a service application of the brakes. After such a braking operation the pressure control valve is practically locked by the auxiliary reservoir pressure against train pipe pressure and the restoration of normal train pipe pressure to effect a release is not sufficient to operate the pressure control valve to supply any leakage from the auxiliary reservoir.

It is a further object of this invention to provide means in the triple valve whereby any leakage from the auxiliary reservoir may be compensated for by a very slight feeding of air through the triple valve. By providing the means to maintain the auxiliary reservoir pressure slightly below the normal train line pressure, over-charging of the auxiliary reservoir pressure through the triple valve is avoided.

In the drawing, Figure 1 is a diagrammatical view of a braking unit consisting of a brake cylinder, auxiliary reservoir, triple valve and auxiliary pressure control valve; Fig. 2 a vertical sectional view of a triple valve constructed in accordance with my Patent No. 1,082,758, showing the auxiliary pressure device in position therein; Fig. 3 a detail sectional view of a slightly modified form of the invention; and Fig. 4 an enlarged detail sectional view of the central portion of the main movable abutment of the triple valve.

Referring to Fig. 1 of the drawing, A designates the train pipe, B the brake cylinder, C the auxiliary reservoir, D the triple valve and E the auxiliary reservoir pressure control valve.

In Fig. 2, 1 designates the train pipe connection to the triple valve; 2 the main train pipe chamber. Above the said chamber 2 and separated therefrom by the main abutment or diaphragm 3 is an auxiliary chamber 4 which is in constant communication with the auxiliary reservoir through the auxiliary passage 5. In order that said abutment 3 may operate valves hereinafter described, the same is made to coöperate with a hollow upright valve stem 6 provided with a reduced upper end upon which are screwed nuts 7. The main diaphragm 3 carries a sliding head 8 which has a working fit around the stem 6 and is provided with a downwardly facing valve seat 9, which coöperates with the charging valve 11, which is a part of upright rod or stem 6. Said valve stem 6 forms a guide for the sliding head 8 so that the air pressures upon the diaphragm 3 may be utilized to positively open and close said valve 11.

Referring more in detail to the construction and operation of the valve device within the head 8, the hollow rod 6 is open at its lower end, but the bore in said rod terminates at a point a little below the valve 11 as indicated by dotted lines in Fig. 2. Air is admitted through inlets 12 into the upper portion of the bore of said rod 6. Said inlets 12 communicate with a clearance 14 around said valve 11. A plurality of ports 15 lead through the wall of the head 8 to admit air to said clearance 14, thence to the inlets 12 which communicate with the interior of the hollow rod 6. The upper portion of hollow rod 6 is provided with a somewhat reduced portion which forms the valve 11 already referred to. Above said valve 11 the stem is provided with a more reduced portion 17, the clearance around which will conduct the air to chamber 4 from around the hollow rod 6 when the valve 11 is opened.

Beneath the main train pipe chamber 2 and separated therefrom by cross wall 19 is a chamber 21 having a vent port 22. Around the rod 6 is a stuffing-box 23 to provide an air-tight fitting through wall 19.

The equalizing abutment 24 extends across the lower side of vent chamber 21 to separate said chamber from the equalizing chamber 25.

Hollow rod 6 has an enlarged portion 26 provided with the upper abutment flange or plate 27. The lower end of said rod screws into a valve cage 28, said valve cage being surrounded at the top by the lower abutment flange 29. The lower portion of said rod 6 is enlarged to form an annular shoulder 31 which abuts against the lower side of cross wall 19 to limit the upward travel of said rod. Said valve cage and rod afford communication between said equalizing chamber 25 and train pipe chamber 2. Said valve cage 28 forms a small chamber 30, the outlet from which is controlled by a valve 32 having a downwardly extending stem 33 carrying a plunger 34 slidable within said valve cage 28. Said plunger 34 carries at its lower end an exhaust valve 35 that opens and closes a vent 36ª. The valve cage 28 is provided with passages 28ª below valve 32. Said valve 35 coöperates with a valve seat 135 on the upper end of an externally threaded adjustable bushing 136. Said bushing 136 is retained in the adjusted position by a lock nut 137. Chamber 25 is inclosed by a casing 138 upon the lower end of which is screwed a protecting cap 139 having vent openings 141. Said valve 35 has a head 36 in which the lower end of plunger 34 is seated and to which said plunger is connected.

The operation of the parts described is precisely the same as set forth in my aforesaid Patent No. 1,082,758; and the remaining portions of the triple valve are constructed and operate as shown and described in said patent, and it is, therefore, thought unnecessary to further describe them herein.

Between the two clamp nuts 7 of the reduced portion 17 of the valve stem is secured a disk-like spring 40 which exerts a slight pressure on the main diaphragm 3 tending to seat valve 9 and to unseat the supplementary feed valve 9ª at the upper end of the portion 17 of the valve stem. The spring 40 exerts a predetermined pressure on the diaphragm 3 and the feed valve 9 will be closed when the auxiliary reservoir pressure, plus the pressure of spring 40, equals the normal train line pressure. The auxiliary reservoir is, in the first instance, charged through the control valve E as set forth in my Patent No. 1,091,754 and the pressure in the train pipe and the auxiliary reservoir is maintained equalized through said control valve until the first service application takes place. After said service application the control valve is what might be termed "locked" by the auxiliary reservoir pressure so that further feeding of air from the train line through said valve to the auxiliary reservoir is prevented until such time as there shall be an equalization of brake cylinder pressure and auxiliary reservoir pressure through an emergency application of the brakes. In the initial charging of the apparatus the air pressures in chambers 2 and 4 of the triple valve are equalized and the spring 40 operates to close valve 9 slightly before said equalization takes place, the pressure of said spring being preferably equal to about four or five pounds. After a service application of the brakes the auxiliary reservoir cannot be overcharged or the pressure therein raised through valve E by an increase in train line pressure so that said valve under these conditions prevents an overcharging of the auxiliary reservoir.

Should leaks occur which reduce the auxiliary reservoir pressure to a point where said pressure plus the pressure of spring 40 does not equal train line pressure the main diaphragm 3 will be moved upwardly by train line pressure to unseat valve 9 and permit air to flow past valves 9 and 9ª into the auxiliary reservoir chamber. It is manifest that until the pressure in the auxiliary reservoir chamber 4 is reduced to a point where the pressure on diaphragm 3 is less than the pressure in the train pipe chamber, valve 9 will be held closed. After the first service application of the brakes, (and the consequent locking of the control valve E) when the pressure in the auxiliary reservoir chamber 4 is reduced by leakage, said pressure cannot be again raised to an equalization with train line pressure by reason of the use of the spring 40. It is manifest that when feeding air into the auxiliary reservoir around valves 9 and 9ª spring 40 will assist auxiliary reservoir pressure in seating valve 9 to thereby stop the feed of air from the train pipe into the auxiliary reservoir chamber, and, therefore, said auxiliary reservoir chamber pressure will be maintained at a pressure below the normal train line pressure. By providing the spring 40 air will be fed from the train line into the auxiliary reservoir chamber 4 very slowly and only sufficiently to compensate for the leaks from the auxiliary reservoir. Should this leak be excessive, or should the train pipe pressure be raised rapidly the diaphragm 3 will be forced upwardly by train line pressure and valve 9ª closed.

The valve 9ª is not primarily a charging valve, the auxiliary reservoir being charged in the first instance through the pressure control valve E as described in my Patent #1,091,754, and leakage from the auxiliary reservoir is to be supplied through valves 9 and 9ᵃ only after the pressure control valve has been locked by a service application of the brakes, and such leakage is to be supplied through said valves until the auxiliary reservoir pressure and brake cylinder pressure has been equalized by an emergency application of the brakes or by a service-emergency application of the brakes. It will, of course, be understood that after such emergency application the recharging of the auxiliary reservoir will take place through the control valve E.

Where the triple valve may be used in a braking unit without the auxiliary pressure control valve E the upper valve 9ᵃ may be dispensed with. This arrangement of the apparatus is indicated in Fig. 3 of the drawing. In this construction the spring 40ᵃ is secured to the valve stem in the same manner as shown in Fig. 2 and the auxiliary reservoir is charged through the ports 15 and around valve 9 as described in my Patent No. 1,082,758. In this arrangement of the apparatus the spring 40ᵃ serves to close the feed valve when the auxiliary reservoir pressure has reached a predetermined point below the normal train line pressure. Of course, should leaks occur reducing the auxiliary reservoir pressure, the valve 9 will be opened and the leak compensated for by air passing from the train line chamber 2 into auxiliary reservoir chamber 4.

From the foregoing it is manifest that by means of the auxiliary pressure control valve over-charging of the auxiliary reservoir is prevented, while at the same time the spring 40 and valves 9 and 9ᵃ permit of a sufficient supply of air to compensate for leaks in the auxiliary reservoir after a service application of the brakes. It is also clear that after an equalization of pressures in the brake cylinder and auxiliary reservoir the auxiliary reservoir may be recharged in the usual manner. It is further to be understood that when the device is used as shown in Fig. 3 without the pressure control valve E there will always be a predetermined difference between the pressures in the auxiliary reservoir and train line so that no overcharging of the auxiliary reservoir will not occur unless an excessive pressure is maintained in the train line for a considerable period.

It is manifest that, when the train line pressure exceeds, to a slight degree, the auxiliary reservoir pressure plus the pressure of the spring 40 the valve 9 will be opened and air will flow gradually around valves 9 and 9ᵃ into chamber 4. In this operation the diaphragm 5 and its supporting members will take a position substantially midway between the valves 9 and 9ᵃ. When, however, the pressure in chamber 4 plus the pressure of the spring 40 equals or slightly exceeds the pressure in the train line chamber 2, valve 9 will be closed. It is manifest, therefore, that upon a leakage from the auxiliary reservoir valve 9 will open slightly and valve 9ᵃ will not be closed. If, however, there is a material reduction in the reservoir pressure diaphragm 5 will be forced upwardly and valve 9ᵃ will be closed, thereby shutting off communication between chambers 2 and 4.

What I claim is:

1. An air brake apparatus comprising a triple valve, an auxiliary reservoir, a train line, a valve interposed between the train line and the auxiliary reservoir to control auxiliary reservoir pressure and through which the auxiliary reservoir is charged, and means in the triple valve to permit a slight leakage of air from the train line to the auxiliary reservoir when the auxiliary reservoir pressure is less than a predetermined amount below normal pressure.

2. An air brake apparatus comprising an auxiliary reservoir, a triple valve, a train line, a valve device interposed between the train line and the auxiliary reservoir through which the auxiliary reservoir may be charged to a predetermined amount, and means in the triple valve for supplying air to the auxiliary reservoir when the train line pressure exceeds auxiliary reservoir pressure more than a predetermined amount.

3. An air brake apparatus comprising an auxiliary reservoir, a triple valve, a train line, a valve device interposed between the train line and the auxiliary reservoir through which the auxiliary reservoir may be charged, and means in the triple valve for supplying air to the auxiliary reservoir when there is a predetermined difference between the train line and the auxiliary reservoir pressure.

4. An air brake apparatus comprising an auxiliary reservoir, a triple valve, a train line, a valve device interposed between the train line and the auxiliary reservoir through which the auxiliary reservoir may be charged, and means in the triple valve for supplying air to the auxiliary reservoir when the train line pressure exceeds auxiliary reservoir pressure within certain predetermined limits of pressure.

5. A triple valve for air brake apparatus provided with a train line chamber, an auxiliary reservoir chamber, a movable abutment separating said chambers and controlling communication therebetween, and means in the auxiliary reservoir chamber for closing communication with the train line chamber when the auxiliary reservoir pressure is a predetermined amount below train line pressure.

6. A triple valve for air brake apparatus provided with a train line chamber and an auxiliary reservoir chamber, a movable abutment between said chambers, a valve controlling communication between said chambers and adapted to be opened and closed by the movement of the said abutment, a spring in the auxiliary reservoir chamber and bearing on said abutment and adapted to close communication between said chamber and the train line chamber when the pressure in the auxiliary reservoir chamber is a predetermined amount below the train line pressure.

7. A triple valve for air brake apparatus provided with a train line chamber and an auxiliary reservoir chamber, a movable abutment between said chambers, a valve controlling communication between said chambers and adapted to be opened and closed by the movement of the said abutment, a spring in the auxiliary reservoir chamber and bearing on said abutment and adapted to close communication between said chamber and the train line chamber when the pressure in the auxiliary reservoir chamber plus the pressure of the said spring equals the train line pressure.

8. A triple valve for air brake apparatus provided with a train line chamber and an auxiliary reservoir chamber, a movable abutment between said chambers, a pair of valves controlling communication between said chambers and adapted to be opened and closed by the movement of the said abutment, one of said valves being adapted to be closed when the abutment moves in one direction, the other being adapted to be closed when the abutment moves in the opposite direction, a spring in the auxiliary reservoir chamber and bearing on said abutment and adapted to close communication between said chamber and the train line chamber when the pressure in the auxiliary reservoir is a predetermined amount below the train line pressure.

9. An air brake apparatus comprising a train line, an auxiliary reservoir, a valve interposed between the train line and the auxiliary reservoir to control auxiliary reservoir pressure and through which the auxiliary reservoir is charged, a triple valve provided with a train line chamber and an auxiliary reservoir chamber, a movable abutment between said chambers, a pair of valves controlling communication between said chambers and adapted to be opened and closed by the movement of said abutment, and means for holding said valves in their midway position to permit air to flow from the train line chamber to the auxiliary reservoir chamber to compensate for leaks in the auxiliary reservoir.

10. A triple valve provided with a train line chamber and an auxiliary reservoir chamber, a movable abutment separating said chambers, a pair of valves controlling communication therebetween and operated by the abutment, and means in the auxiliary reservoir chamber for opposing the pressure in the train line chamber to hold the valves in their midway position to compensate for slight reductions in the auxiliary reservoir pressure.

In testimony whereof I hereunto affix my signature in the presence of two witnesses.

SPENCER G. NEAL.

Witnesses:
 G. V. PIERCE,
 G. G. WIGGINS.